UNITED STATES PATENT OFFICE.

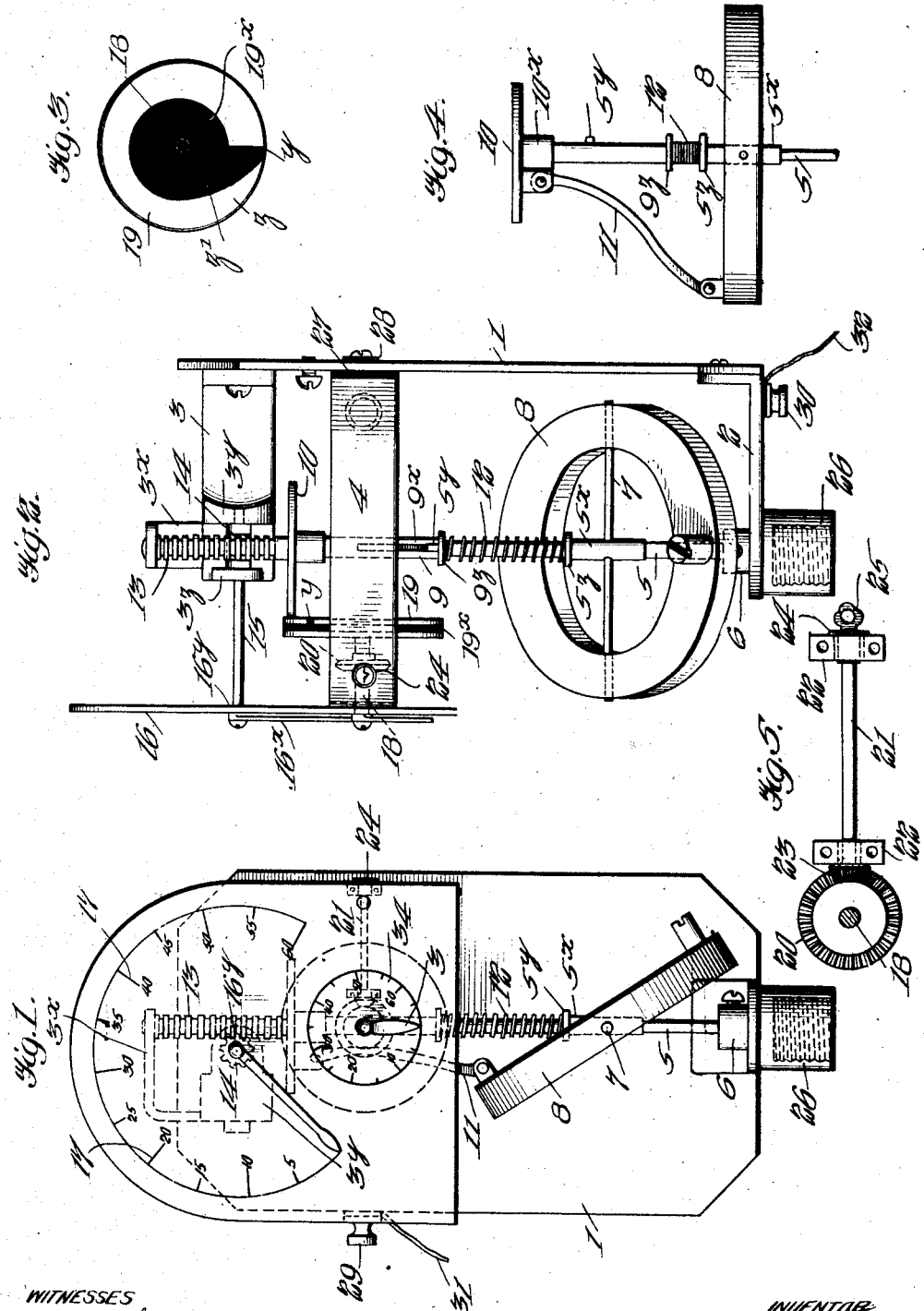

JAMES HENRY CORE, OF NASHVILLE, TENNESSEE, ASSIGNOR OF ONE-HALF TO ELIZABETH HARRIS CORE, OF NASHVILLE, TENNESSEE.

SPEED MEASURING AND CONTROLLING DEVICE.

1,110,900.  Specification of Letters Patent.  Patented Sept. 15, 1914.

Application filed March 14, 1913. Serial No. 754,230.

*To all whom it may concern:*

Be it known that I, JAMES H. CORE, a citizen of the United States, and a resident of Nashville, in the county of Davidson and State of Tennessee, have made certain new and useful Improvements in Speed Measuring and Controlling Devices, of which the following is a specification.

My invention relates to improvements in devices for measuring speed and for controlling the speed of vehicles, and it consists in the combinations, constructions and arrangements herein described and claimed.

An object of my invention is to provide means for accurately indicating the speed of a vehicle and for enabling the user of the vehicle to set the device so that it will automatically control the speed.

A further object of my invention is to provide a novel form of apparatus for accomplishing the above named results, the device being primarily designed to be used with the ignition circuits of automobiles having internal combustion engines or with the motor circuit of electric automobiles.

A further object of my invention is to provide means for accomplishing the above named results which are simple in their nature and inexpensive to manufacture.

Other objects and advantages will appear in the following specification and the novel features of the device will be particularly pointed out in the appended claims.

My invention is illustrated in the accompanying drawings forming part of this application in which similar reference characters indicate like parts in the several views and in which—

Figure 1 is a face view of the device, Fig. 2 is a side view thereof, Fig. 3 is a face view of the contact disk, Fig. 4 is a detail view showing the centrifugal device, and Fig. 5 is a detail view showing a portion of the speed control mechanism.

In carrying out my invention I provide a base plate 1 having a lower bracket 2 secured thereto and an upper bracket 3 and a frame portion 4 disposed between the brackets. The upper bracket has an extension $3^x$ between which and the lower bracket a shaft 5 is journaled. The shaft is provided with a collar 6 near its lower end to keep it in position. At $5^x$ the shaft 5 is enlarged to receive a cross member 7 which is rigid with the portion $5^x$ and whose ends pass loosely through the walls of a ring 8. The ring is thus free to turn on the support 7. Disposed upon the shaft 5 is a sleeve 9 having a slot $9^x$ arranged to receive a pin $5^y$ secured to the shaft 5. Secured to the sleeve by means of an integral collar $10^x$ is a disk 10 and pivotally connecting the ring 8 and the collar $10^x$ is a link 11. A spring 12 is disposed between a flange $5^z$ on the enlarged portion $5^x$ of the shaft and a flange $9^z$ on the sleeve 9.

At 13 I have shown a circular rack which is integral with the sleeve 9, and which is designed to engage a gear 14 rigidly secured to a shaft 15 journaled in lateral extensions $3^y$ of the bracket 3. A dial plate 16 is secured to the frame portion 4 and the end of the shaft 15 projects through the dial plate and has secured to it an indicating hand or pointer $16^x$. The dial plate is provided with numerals such as those shown at 17 on its face for indicating the speed.

Journaled in the frame portion 4 is a stub shaft 18 bearing a contact disk 19 and also a gear 20. The contact disk is preferably made of three parts, as shown in Fig. 2. The outer faces 19 are made of metal and the inner portion $19^x$ is made of some suitable insulating material such as fiber, rubber, or the like. That portion of the contact disk which faces the disk 10 is cut away as shown in Fig. 3 so as to permit the insulation $19^x$ to extend flush with the surface of the disk. As will be seen from Fig. 3 this insulation extends to the outer edge of the disk as shown at $y$ and its outer line is curved, gradually approaching the center until at $x$ the thickness of the metal is greatest.

In Fig. 5 I have shown a key shaft 21 which is mounted in brackets 22 and is provided with a gear 23 arranged to engage the gear 20 on the shaft 18. The outer end of the key shaft 21 is preferably provided with a barrel such as that shown at 24 in Fig. 2 having a slot arranged to receive a key 25.

From the foregoing description of the various parts of the device the operation thereof may be readily understood.

A rotatable member such as a flexible shaft or other similar device connected with the running parts of the machine (not shown) may be connected with the threaded socket 26 on the end of the shaft 5, so that whenever the vehicle is running the shaft 5 will be turned. The rotation of the shaft 5 will tend to cause the ring 8 to assume a position at right angles to the shaft like that shown in Fig. 4. This movement will be resisted by means of a spring 12. The greater the speed of the vehicle the greater will be the centrifugal force tending to compress the spring, since the ring will tend to move the disk 10 through the medium of the link and also the sleeve 9. The movement of the sleeve 9 will cause the movement of the integral rack 13 and hence the revolution of the shaft 15 proportional to the movement of the sleeve. The dial 17 is designed to be graduated so that as the speed increases the hand will indicate the increase in speed. As the speed decreases the spring 12 will, of course, push the sleeve back to its normal position, thereby bringing the hand on the dial with it.

The means for controlling the speed consists of the disk 10 which is in engagement with the contact disk 19. The contact disk may be turned by inserting the key 25 in the barrel 24 and turning the shaft 21 which through the gear 23 will turn the shaft 18 so as to revolve the contact disk 19. The contact disk, as stated before, is mounted on the stub shaft 18 which is carried by the frame member 4. The latter is insulated from the plate 1 by suitable insulation such as that shown at 27 and 28. The shaft 15 extends through an opening $16^y$ in the dial plate 16 so that the latter is not in contact with the shaft 15. A binding post 29 is connected to the frame portion 4 and a similar binding post 30 may be connected to any part of the frame such as on the bracket 2.

The wires 31 and 32 may be in the ignition circuit of an internal combustion engine, or in the motor circuit of an electric vehicle. If the contact disk 19 should be turned to the point $y$ (see Fig. 3) then the electric circuit would be broken, but if the contact disk should be turned to a point $z$ then the circuit would be established. Any movement of the disk 10 will be toward the shaft 18 so that when the disk 10 reaches a point as $z'$ (see Fig. 3) it will now be upon the insulating portion $19^z$ and hence the circuit will be broken. By turning the contact disk the space which the disk 10 has to traverse before reaching the insulating portion $19^x$ may be varied so as to accord with the predetermined speeds. The device may thus be set to automatically break the circuit at any predetermined speed by inserting the key and turning it. The hand 33 will move over the face of the dial 34 (see Fig. 1) to the desired speed. The key may then be withdrawn.

If the device is an electric vehicle and the speed exceeds the predetermined amount the circuit will be broken and the vehicle will slow down, when the circuit will again be made. The ignition circuit may be broken in a similar manner so that it is necessary for the automobile to slow down to the desired speed before the ignition circuit is completed.

The device described above forms an efficient speedometer and at the same time it absolutely prevents the exceeding of the speed limit when once set. The device is simple in construction and positive in action and the parts cannot readily get out of order. Each device is designed to have a key of a different shape with a barrel to correspond so that the speed control mechanism cannot be tampered with.

I claim:—

1. A speed measuring and controlling device comprising a rotatable shaft, a sleeve slidably mounted thereon, a centrifugal device carried by said shaft and having connection with the sleeve, a disk carried by said sleeve and movable along the shaft therewith, a circular contact disk having a conducting portion of varying width on one side thereof arranged to be engaged by said disk, and means for rotating the contact member to vary the time of engagement of the conducting portion with the first named disk during a given movement of the latter along the shaft.

2. A speed measuring and controlling device comprising a rotatable shaft, a sleeve slidably mounted thereon, a centrifugal device carried by said shaft and having connection with the sleeve, a disk carried by said sleeve and movable along the shaft therewith, and a circular contact disk, the center of said contact disk being on a line extending through the axis of said shaft, said contact disk having an interior insulating portion and a conducting rim portion, the width of said conducting portion being greatest along one radius of the contact wheel and being progressively less on the other radii of the contact wheel.

3. A speed measuring and controlling device comprising a rotatable shaft, a sleeve slidably mounted thereon, a centrifugal device carried by said shaft and having connection with the sleeve, a disk carried by said sleeve and movable along the shaft therewith, a circular contact disk, the center of said contact disk being on a line extending through the axis of said shaft, said contact disk having an interior insulating portion and a conducting rim portion, the width of said conducting portion being greatest along one radius of the contact wheel and being progressively less on the other radii of the contact wheel, and means for revolving the contact wheel to bring predetermined parts of the conducting portion in engagement with said disk.

4. A speed measuring and controlling device comprising a rotatable shaft, a sleeve slidably mounted thereon, a centrifugal device carried by said shaft and having connection with the sleeve, a disk carried by said sleeve and movable along the shaft therewith, a circular contact disk, the center of said contact disk being on a line extending through the axis of said shaft, said contact disk having an interior insulating portion and a conducting rim portion, the width of said conducting portion being greatest along one radius of the contact wheel and being progressively less on the other radii of the contact wheel, means for revolving the contact wheel to bring predetermined parts of the conducting portion in engagement with said disk, said means comprising a shaft for the contact wheel, a gear on said contact wheel shaft, a key shaft arranged to receive the key, and a gear between said key shaft and said first named gear.

5. A speed measuring and controlling device comprising a rotatable shaft, a sleeve slidably mounted thereon, a centrifugal device carried by said shaft and having connection with the sleeve, a disk carried by said sleeve and movable along the shaft therewith, a circular contact disk, the center of said contact disk being on a line extending through the axis of said shaft, said contact disk having an interior insulating portion and a conducting rim portion, the width of said conducting portion being greatest along one radius of the contact wheel and being progressively less on the other radii of the contact wheel, means for revolving the contact wheel to bring predetermined parts of the conducting portion in engagement with said disk, said means comprising a shaft for the contact wheel, a gear on said contact wheel shaft, a key shaft arranged to receive the key, a gear between said key shaft and said first named gear, a dial having indicating members, and a hand rigidly secured to the contact wheel shaft.

6. A speed measuring and controlling device comprising a rotatable shaft, a sleeve slidably mounted thereon, a centrifugal device carried by said shaft and having connection with the sleeve, a disk carried by said sleeve and movable along the shaft therewith, and a circular contact disk, the center of said contact disk being on a line extending through the axis of said shaft, said contact disk having an interior insulating portion and a conducting rim portion, said conducting rim portion being arranged to engage the disk carried by said sleeve, and the width of said conducting portion being greater along certain radii of the contact wheel than on certain other radii.

JAMES HENRY CORE.

Witnesses:
W. M. BRAGG,
E. C. LUTON.

Copies of this patent may be obtained for five cents each, by addressing the "Commissioner of Patents, Washington, D. C."